United States Patent [19]
Torres

[11] 3,913,603
[45] Oct. 21, 1975

[54] CRASHWORTHY FLAPPER VALVE

[75] Inventor: Jorge Torres, Newbury Park, Calif.

[73] Assignee: Purolator, Inc., Newbury Park, Calif.

[22] Filed: Jan. 14, 1974

[21] Appl. No.: 433,129

[52] U.S. Cl. .................. 137/68; 137/614; 251/74
[51] Int. Cl.² ...................................... F16K 17/40
[58] Field of Search.......... 137/614, 614.01, 614.02, 137/614.03, 614.06, 572, 67, 68, 69; 251/66, 74

[56] References Cited
UNITED STATES PATENTS

| | | | |
|---|---|---|---|
| 2,426,471 | 8/1947 | Snyder | 137/614.06 |
| 2,673,707 | 3/1954 | McRae | 137/68 X |
| 2,699,181 | 1/1955 | Spayd | 137/614 |
| 3,209,773 | 10/1965 | Klaus | 137/68 |

*Primary Examiner*—Martin P. Schwadron
*Assistant Examiner*—Robert J. Miller
*Attorney, Agent, or Firm*—George F. Smyth

[57] ABSTRACT

A crashworthy valve including a valve body having a passage therethrough and a valve seat in the passage. A valve element is mounted in the passage for pivotal movement between an open position and a closed position. The valve element is normally held in the open position. The valve body has a frangible region and in response to rupturing of the frangible region, the valve element is freed for pivotal movement to the closed position.

25 Claims, 11 Drawing Figures

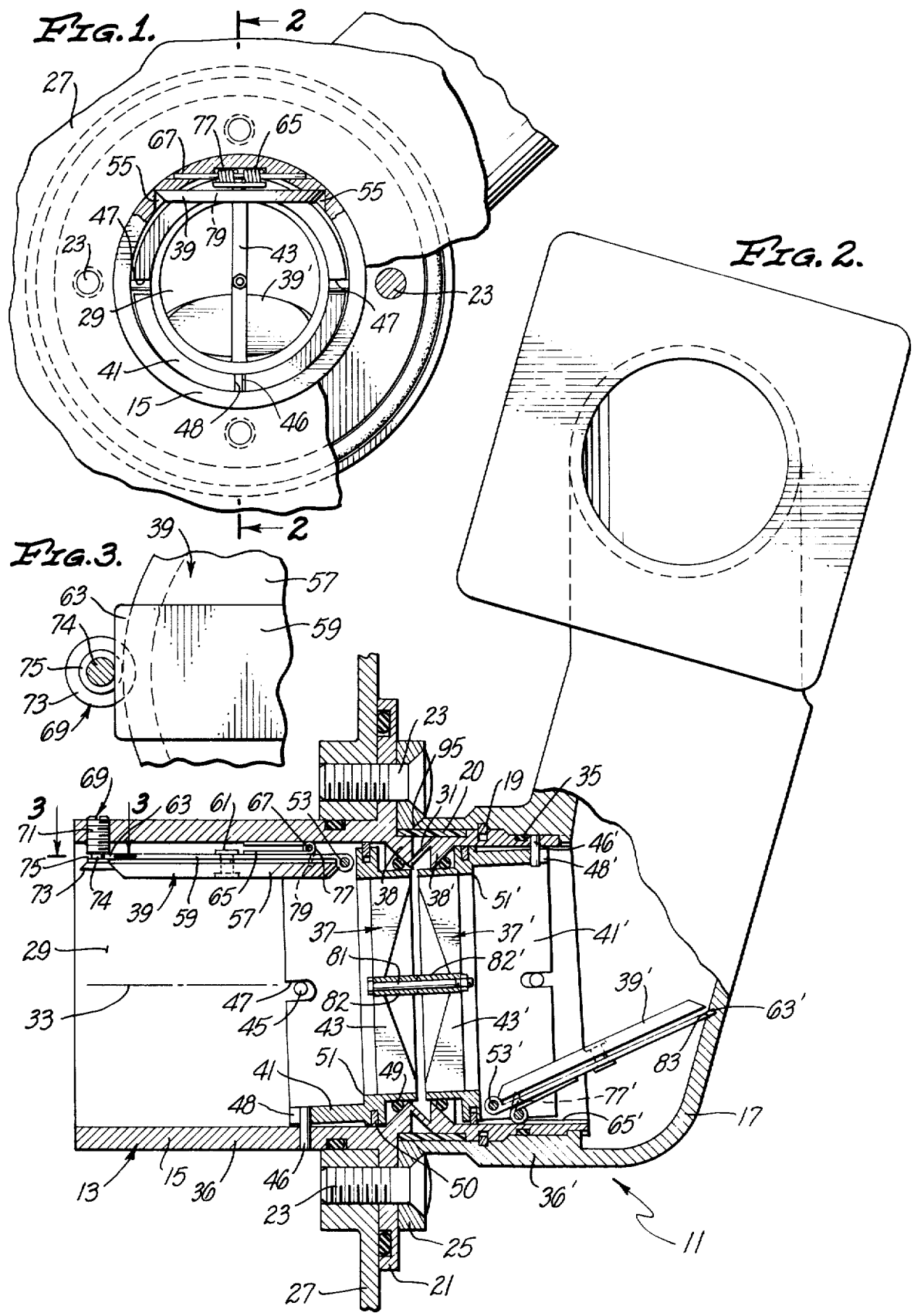

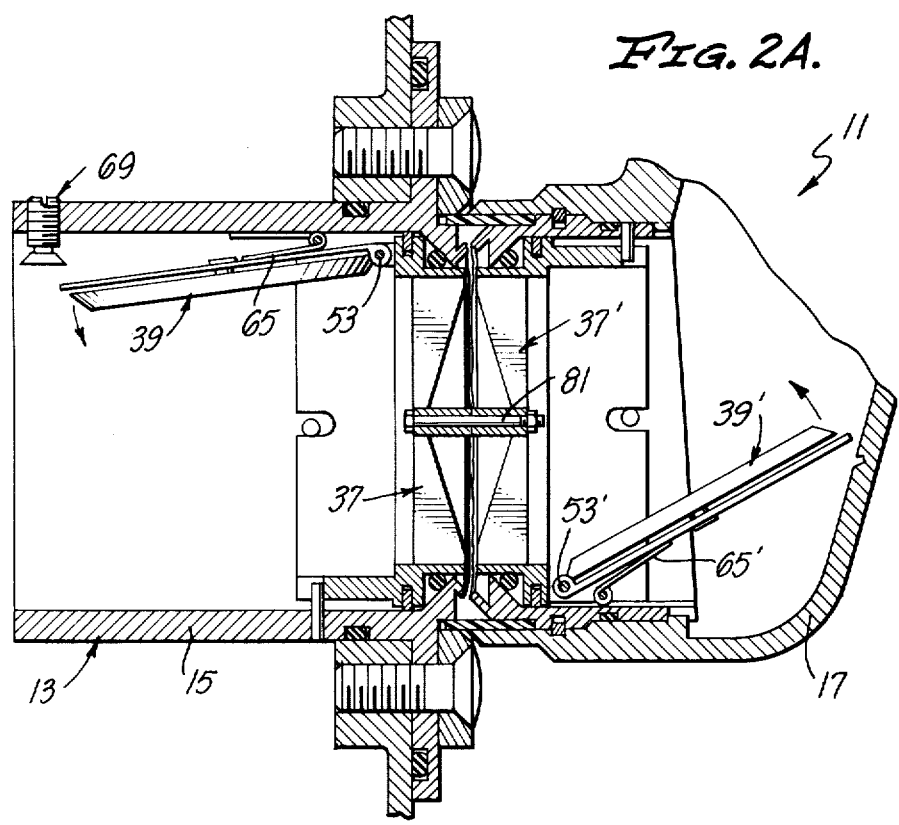
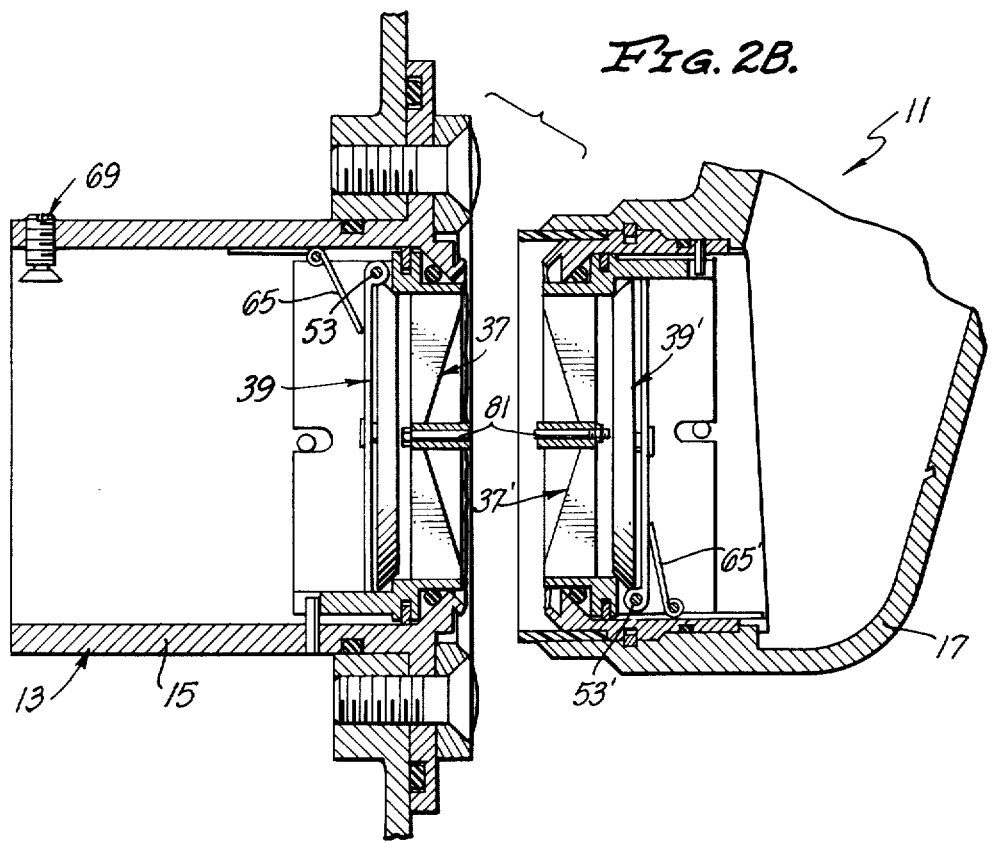

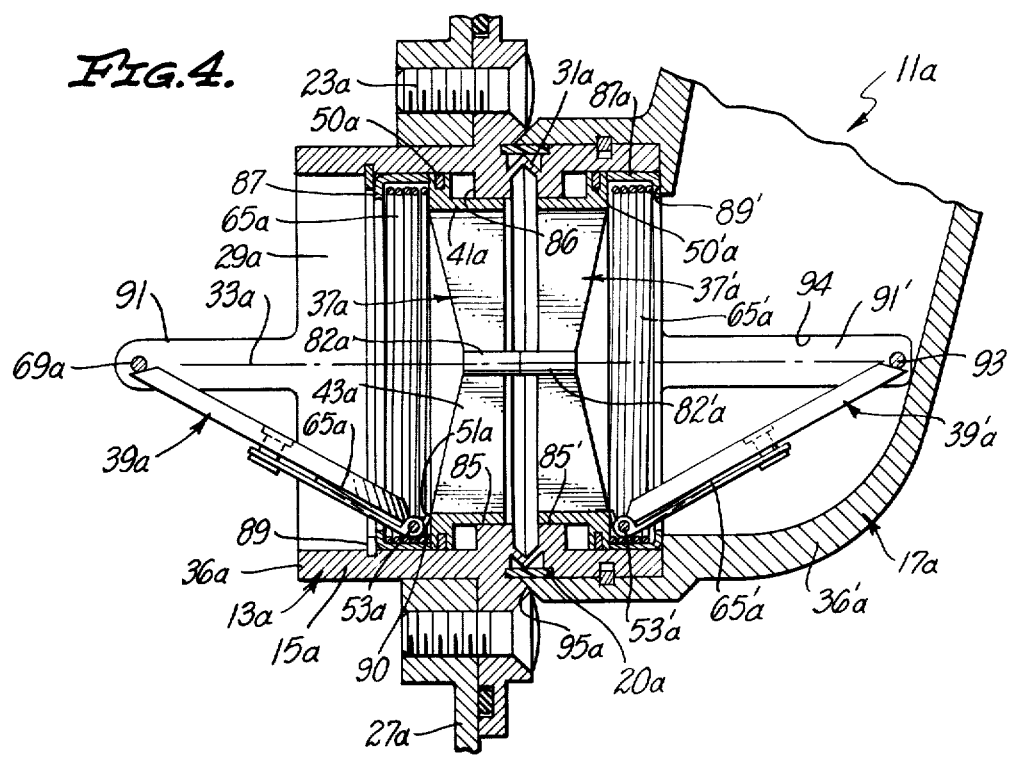
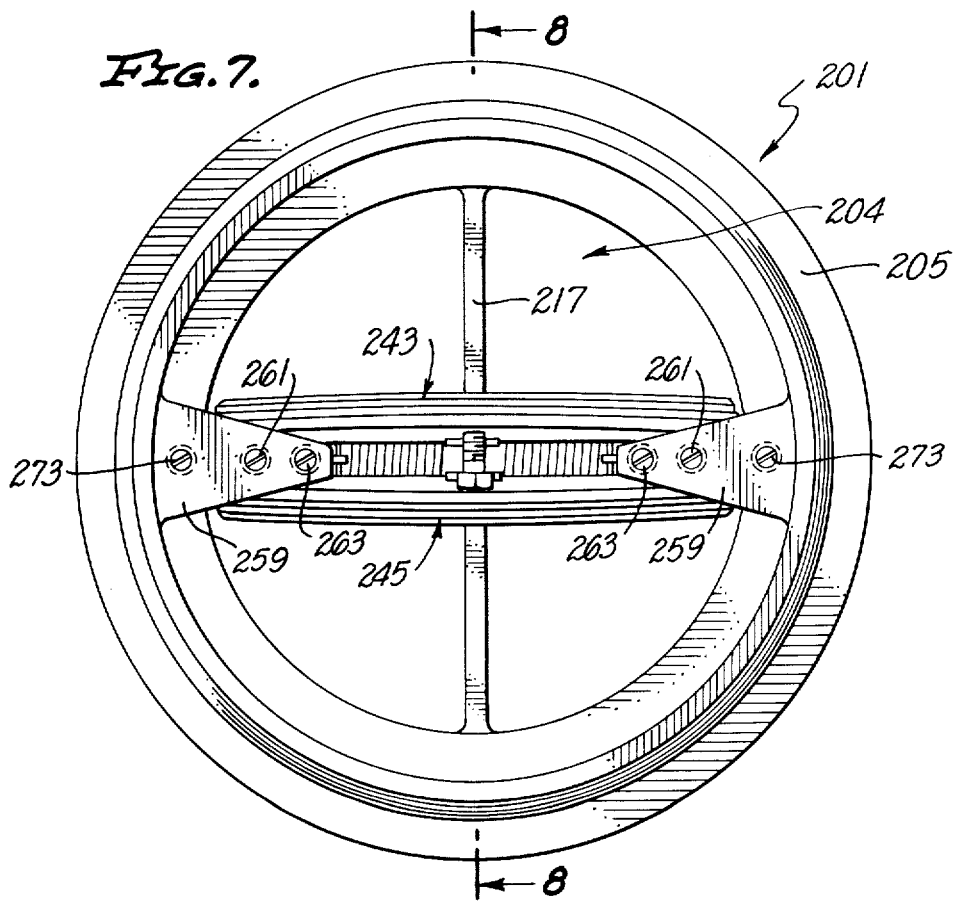

CRASHWORTHY FLAPPER VALVE

BACKGROUND OF THE INVENTION

One of the primary dangers associated with aircraft crashes is the breakage of fuel lines and the consequent spillage of fuel. The spilled fuel creates a very dangerous fire hazard.

In an attempt to solve this problem, crashworthy valves are used. A crashworthy valve contains a weakened region. If a crash occurs, the failure of the fuel line willl occur at the valve. The crashworthy valve is responsive to such failure to close the fuel line to prevent substantial fuel spillage.

During normal operation of the aircraft, the crashworthy valve is open to permit fuel flow therethrough. In other words, except for the extremely rare situation in which a crash occurs, the crashworthy valve is open. Ideally during normal operation of the aircraft, the aircraft fuel system should function as though the crashworthy valve were not present.

One problem with prior art crashworthy valves is that they provide an unduly large pressure drop in the system in which they are installed. To maintain a desired output pressure in a system employing crashworthy valves, it has been necessary heretofore to increase the discharge pressure of the pump and/or increase the diameters of the crashworthy valves and the conduits of the fuel system.

SUMMARY OF THE INVENTION

A crashworthy valve typically includes a valve element which is movable between open and closed positions. Poppet valves which move linearly along the axis of the flow passage are often used. One reason that there is a high pressure drop across a typical prior art crashworthy valve is that the valve element is located in the flow path in the open position so that the valve element provides substantial resistance to fluid flow.

The present invention materially reduces the pressure drop across a crashworthy valve by positioning the valve element in the open position so that it does not afford substantial resistance to fluid flow. With this invention the valve element may be substantially removed from the flow path when the valve element is in the open position. This can best be accomplished by mounting the valve element for pivotal movement between the open and closed positions thereof. When so mounted, the valve element is moved toward the periphery of the conduit in the open position so that it provides a minimal obstruction to fluid flow. This can be contrasted to poppet valve elements which lie along the axis of fluid flow in the open position.

Although the valve element could be located substantially outside the envelope or outside diameter of the conduit in the open position, this would increase the size and weight of the unit. It is preferred to keep the valve element substantially within the normal configuration of the conduit in the open position. This means that a gate valve design in which the valve element is movable linearly in a radial direction between the open and closed positions is not preferred because of space and weight requirements.

The valve element is normally releasably held in the open position by holding means. The crashworthy valve has a valve body including first and second sections interconnected by a frangible region. Upon the occurrence of a crash, the frangible region ruptures and the valve element is freed from the holding means for movement to the closed position.

A crashworthy valve should either be in the fully opened or fully closed position. This can be simply and inexpensively accomplished by mounting the valve element for movement with a carrier which is movable in response to rupture of the frangible region. If desired, the valve element may be mounted on the carrier. The valve element may be biased toward the closed position, but held in the open position by the holding means. The valve element moves with the carrier. This pulls the valve element out of cooperating engagement with the holding means to thereby free the valve element for movement to the closed position.

The carrier can be moved in various ways in response to fracturing of the frangible region. For example, the carrier may be moved by a spring, and/or the carrier may be frangibly tied to an associated member or carrier on the other side of the frangible region. In this latter event separation of the valve body at the frangible region results in pulling the carrier in a direction to release the valve element.

The carrier must normally be held or retained against sufficient movement to release the valve element. This function can be performed in different ways. However, if the crashworthy valve has two separate units, the carrier of each of these units can be used as the retaining means, or as a portion thereof, for the other.

The carrier may be of different constructions. For example, the carrier may be in the form of a piston and move linearly or it may pivot in response to fracturing of the frangible region. A piston-type carrier is easier to make, but it does require somewhat more room. If a pivoting-type carrier is employed, the carrier is preferably tilted in its normal position and pivots toward a coaxial position with the valve body in response to fracturing of the frangible region. If the carrier is not tilted in the open position a more complex biasing arrangement for the carrier would be required. The pivot axes for the valve elements preferably extend generally transverse to the axis of the passage through the valve body.

The holding means can take various forms. For example, it may include a tongue-in-groove or pin-in-slot connection which is disconnected in response to appropriate movement of the carrier. In either event a ledge is defined to support or hold the valve element in the open position. The valve element is released by moving the valve element off of the ledge. The holding means may be adjustable radially of the passage through the valve body to adjust the location of the valve element in the open position and to move the holding means and valve element tightly together to minimize vibration.

The pivotable valve element concept is applicable to a wide variety of crashworthy valves. For example, a valve element may be provided in one or both of the sections of the valve body. For large diameter valves, a plurality of valve elements may be conveniently utilized for each of the sections of the body. Each of the valve elements closes a different portion of the passage in the closed position.

It is also possible to utilize the present invention in a crashworthy valve which includes a valve body having more than two sections interconnected by frangible regions. In response to rupture of any one of these frangible regions, all of the valve elements are automatically closed. This can be accomplished, for example, by utilizing an appropriate linkage to interconnect the carriers of each of the crashworthy valve units.

The invention can best be understood by reference to the following description taken in connection with the accompanying illustrative drawing.

BRIEF DESCRIPTION OF THE DRAWING

FIG. 1 is a fragmentary, end elevational view of one embodiment of crashworthy valve constructed in accordance with the teachings of this invention with the valve elements in the open position.

FIG. 2 is a sectional view taken generally along line 2—2 of FIG. 1.

FIG. 2A is an enlarged fragmentary sectional view similar to FIG. 2 illustrating the crashworthy valve immediately upon rupture of the frangible region and with the valve elements in the releasing position.

FIG. 2B is an enlarged fragmentary sectional view similar to FIG. 2 after complete separation of the sections of the crashworthy valve and with the valve elements in the closed position.

FIG. 3 is an enlarged, fragmentary sectional view taken generally along line 3—3 of FIG. 2 and showing one form of holding means for holding the valve element in the open position.

FIG. 4 is a fragmentary, sectional view similar to FIG. 2 showing a second embodiment of the crashworthy valve.

FIG. 7 is an end elevational view of a fourth embodiment of crashworthy valve constructed in accordance with the teachings of this invention.

DESCRIPTION OF THE PREFERRED EMBODIMENTS

Figure 5:
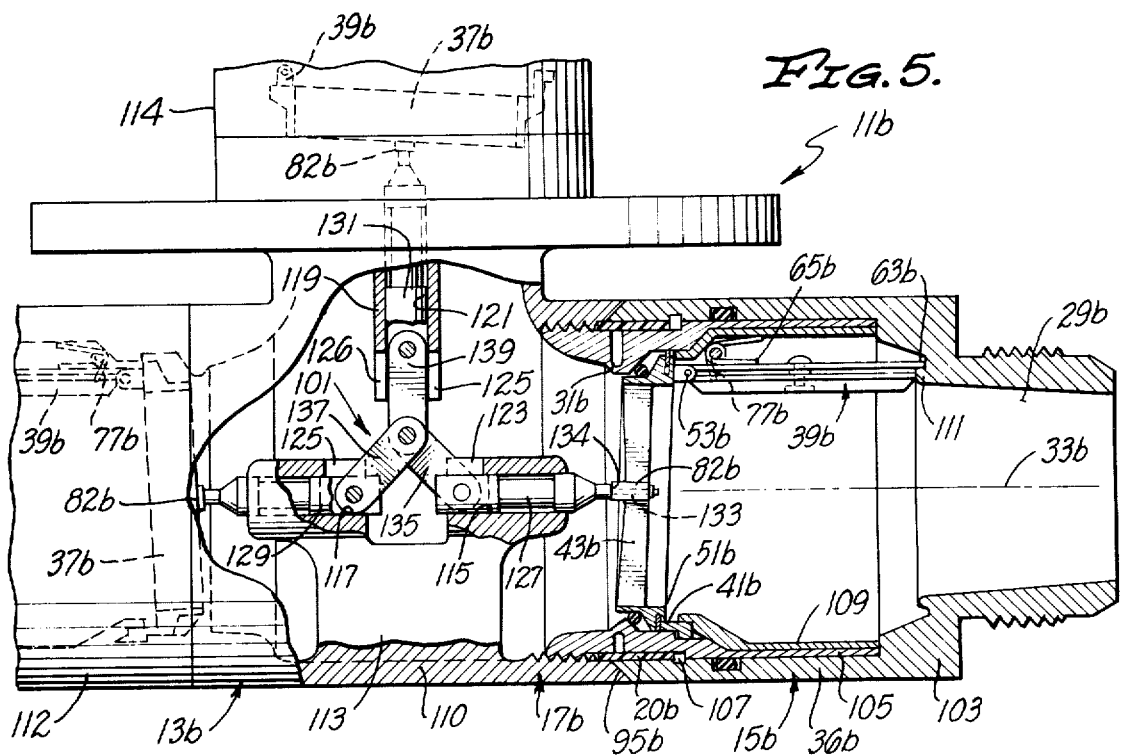
FIG. 5 is an elevational view partially in section of a third embodiment of crashworthy valve constructed in accordance with the teachings of this invention.

FIGS. 1-3 show a crashworthy valve 11 constructed in accordance with the teachings of this invention. The crashworthy valve 11 includes a valve body or body means 13. The valve body 13 includes a first body portion 15 and a second body portion 17 suitably interconnected by a retaining ring 19. A seal 20 lies between the body portions 15 and 17. The body portion 15 has a mounting flange 21. A plurality of screws 23 extend through a ring 25 and the mounting flange 21 to attach the crashworthy valve to suitable aircraft structure 27.

The valve body 13 may have a very wide variety of configurations, however, it is important that the valve body have a passage 29 through which a fluid, such as a liquid fuel can flow. In the embodiment illustrated, the passage 29 is substantially circular in cross section and extends completely through the valve body 13.

Another important characteristic of the valve body 13 is that it has a frangible region such as an annular frangible region 31. The frangible region 31 is structurally weaker than other portions of the valve body 13. The frangible region 31 is sufficiently strong so that it does not break during ordinary usage of the aircraft in which the valve 11 is mounted, but it will break under the stresses normally encountered during a crash. The frangible region 31 may be frangible in response to various different forms of loading, and in the embodiment illustrated the frangible region is breakable in tension, bending, and shear. In the embodiment illustrated in FIGS. 2-3, the frangible region 31 is a relatively thin wall section of the body portion 15, and it extends at approximately a 45° angle to a central axis 33 of the passage 29.

Although various constructions are possible, one end portion of the body portion 15 is telescoped within an end portion of the body portion 17. The body portions 15 and 17 are suitably sealed as by an O-ring seal 35.

The valve body 13 may be considered to be divided by the frangible region 31 into two sections 36 and 36' with the frangible region interconnecting such sections. Thus, with respect to FIG. 2, the body section 36 is defined by the region of the body portion 15 to the left of the frangible region 31. The section 36' is defined by the body portion 17 and the region of the body portion 15 to the right of the frangible region 31. Upon rupture of the frangible region 31, the sections 36 and 36' separate. Annular carrier seats 38 and 38' are provided in the sections 36 and 36', respectively.

The crashworthy valve 11 includes carriers 37 and 37' and valve elements 39 and 39'. Except to the extent noted herein, the carrier 37 and the valve element 39 are identical to the carrier 37' and the valve element 39', respectively. Accordingly, only the carrier 37 and the valve element 39 are described in detail herein. Portions of the carrier 37' and the valve element 39' corresponding to portions of the carrier 37 and the valve element 39 are designated by corresponding primed reference numerals.

The carrier 37 includes a generally tubular section 41 and a radially extending web 43. In the embodiment illustrated in FIGS. 1-3, the carrier 37 is mounted on the valve body 13 within the passage 29 by two radially extending pins 45 and one radial pin 46 which are received within axially extending slots 47 and 48 in the tubular section 41. In the embodiment illustrated, the slots 47 and 48 are spaced apart 90° as shown in FIG. 1. The pins 45 and 46 and the slots 47 and 48 allow pivotal movement of the carrier 37 along a generally arcuate path in response to rupture of the frangible region 31 as described more fully hereinbelow. Annular seals 49 and 50 prevent leakage of fluid between the carrier 37 and the valve body 13. The carrier 37 defines an annular valve seat 51.

The upper end of the tubular section 41 is open, i.e., the tubular section 41 is cut away, to permit the valve element 39 to be mounted on the carrier 37 by a pin 53. When so mounted, the valve element 39 is pivotable between an open position shown in FIG. 3 and a closed position shown in FIG. 2B. In the open position, the valve element lies generally along the periphery of the passage 29 and substantially out of the flow path. Accordingly, the valve element 39 provides substantially no resistance to fluid flow, and the pressure drop thereacross is minimized. As shown in FIG. 1, the housing portion 15 has cutout portions 55 which allow the valve element 39 to be moved the maximum possible distance out of the flow path provided by the passage 29.

In the open position, the valve element 39 is, of course, spaced from the valve seat 51. In the closed position (FIG. 2B), the valve element 39 sealingly engages the valve seat 51 to close the passage 29 at the valve seat 51.

The pin 53 extends transverse to the central axis 33 and lies closely adjacent the periphery of the passage 29. The pin 53 lies along the top of the passage 29 in the orientation shown in FIGS. 1 and 2 and defines the pivot axis of the valve element 39.

The valve element 39 must be of the proper size and shape to close the passage 29 at the valve seat 51. The valve element 39 may be constructed of one or more pieces, and in the embodiment illustrated in FIGS. 1–3, the valve element 39 includes a relatively broad plate or plug 57 sized to seat on the valve seat 51 and close the passage 29, a mounting member 59, and a rivet 61 or other suitable fastener for interconnecting the plug and the mounting member. One end of the mounting member 59 provides a passage for receiving the pin 53 and the other end of the mounting member 59 extends beyond the plug 57 to form a tab or finger 63.

It is preferred to provide means for urging the valve element 39 toward the closed position. In the embodiments illustrated in FIGS. 1–3, the valve element 39 is resiliently urged toward the closed position by a torsion spring 65 which is wound on a pin 67. The pin 67 is mounted on and sealed to the body portion 15. The ends of the torsion spring 65 bear against the valve element 39 and the body portion 15.

The valve element 39 is normally retained in the open position shown in FIG. 3 by holding means 69 which is threaded into the body portion 15. The holding means 69 may take any form which is suitable for releasably retaining the valve element 39 in the open position and which will release the valve element for movement to the closed position in response to rupture of the frangible region 31. The holding means 39 performs these functions, and in addition can be used to adjust the angular position of the valve element 39 about the pin 53. This enables the valve element 39 to be tightly retained in the open position to thereby minimize vibration.

The holding means 69 has a threaded portion 71 and a conical portion 73 interconnected by a short stem 74 of reduced diameter. An annular groove 75 lies intermediate the portions 71 and 73. The finger 63 of the valve element 39 is receivable within the groove 75. The surface which engages the finger 63 to retain the valve element 39 in the open position constitutes a ledge.

By turning of the threaded portion 71 to move the holding means 69 radially, the position of the valve element 39 in the open position thereof can be adjusted. Moreover, the stem 74 is eccentric relative to the threaded portion 71. Accordingly, by adjusting the angular position of the threaded portion 71 and hence of the stem 74, the stem can be brought into tight contact with the end of the finger 63. Thus, with the adjustable holding means 69, the valve element 39 can be held tightly upwardly against the spring 65, and the stem 74 can be held in tight engagement with the end of the finger 63. This minimizes vibration of the valve element 39 during use.

In order to move the valve element 39 to the closed position, the carrier 37 must move to the right in response to rupturing of the frangible region 31. This can be accomplished in various different ways, and the embodiment of FIGS. 1–3 illustrates, by way of example, two ways for implementing this concept. First, the carrier 37 and the valve element 39 are urged to the right by a torsion spring 77 which is wound on the pin 67. One end of the spring 77 bears against the body portion 15 and the other end 79 is received within a groove in the valve element 39. Accordingly, the end 79 of the spring 77 tends to urge the valve element 39 and the carrier 37 to the right as viewed in FIG. 2.

A second mechanism for moving the carrier 37 to the right in response to rupture of the frangible region 31 is a frangible bolt 81. The webs 43 and 43' include bosses 82 and 82', respectively, which are centrally located in the passage 29 and which are in engagement with each other. The frangible bolt 81 extends through the bosses 82 and 82' to thereby interconnect the webs 43 and 43' at a central location. For example, a tensile load which ruptures the frangible region 31 will be transmitted to the frangible bolt 81 to move the carrier 37 to the right relative to the holding means 69.

The spring 77 and the frangible bolt 81 may be used together as shown in FIG. 3 or separately. One advantage of the spring 77 is that it urges the carrier 37 against the seal 49 in the closed position (FIG. 2B). The bolt 81 positively assures that the valve element 39 will be pulled out of the groove 75 in response to rupturing of the frangible region 31; however, the strength of the frangible bolt 81 must be controlled so that it breaks subsequent to the frangible region 31 but prior to failure of the remainder of the structure of the crashworthy valve 11.

The carrier 37' is identical to the carrier 37 except that it is rotated 180° from the position occupied by the carrier 37. Thus, the slot 48' is located at the top of the tubular section 41', and the tubular section 41' is open at the bottom. The valve element 39a is identical to the valve element 39 except that the pin 53' mounts the valve element 39' for pivotal movement about a transversely extending pivot axis located closely adjacent the bottom of the passage 29.

The valve element 39' could be held in the open position by holding means identical to the holding means 69. However, in the embodiment illustrated, the holding means includes a groove 83 in the body portion 17 which receives the end of the finger 63'. Thus, the groove 83 defines a ledge against which the end of the finger 63' bears to normally maintain the valve element 39' in the open position shown in FIG. 2. With this construction, the valve element 39' is open as much as the physical contraints of the body portion 17 will allow. Of course, if the body portion 17 were to allow it, the valve element 39' could be opened as fully as the valve element 39.

The carriers 37 and 37' are pivotable or tiltable on the pins 46 and 46', respectively, relative to their associated sections 36 and 36'. The carrier 37 is pivotable about a generally transversely extending axis extending through the pin 46 and lying along the bottom of the passage 29. The carrier 37 is pivotable clockwise from the position shown in FIG. 2 to the position shown in FIG. 3B. Similarly, the carrier 37' is pivotable about a transverse axis extending through the pin 46' near the top of the passage 29 clockwise from the position shown in FIG. 3 to the position shown in FIG. 3B.

With the frangible region 31 intact, the carrier 37 is prevented from moving along its arcuate path relative to the section 36 by retaining means. Specifically, the resilient force of the spring 77 is transmitted through the valve element 39, the carrier 37, the bosses 82 and 82', and the carrier 37' to the pin 46' and through the valve element 39' to the wall of the groove 83. Similarly, the force of the spring 77' is transmitted to the pin 46 and to the holding means 69.

The carriers 37 and 37' are tilted slightly counterclockwise (as viewed in FIG. 2) from the position coaxial with the axis 33. Thus, the carrier 37 is spaced from the upper portions of the carrier seat 38, and the carrier 37' is spaced from the lower portions of the carrier seat 38'. In addition, the pins 53 and 53' are mounted on the opposite sides of their respective carriers 37 and 37'. This allows the tilted carriers 37 and 37' to be kept substantially parallel to each other and to pivot as a unit in the same direction.

In use under normal conditions, the crashworthy valve 11 is in the open position shown in FIG. 2. The crashworthy valve closes in response to a predetermined amount of relative movement between the sections 36 and 36' with the amount of such relative movement required for valve closure being adjustable. If a crash occurs and this results in, for example, a tension load on the crashworthy valve 11, the frangible region 31 distorts and ultimately ruptures to allow relative axial movement of the two sections 36 and 36' of the valve body 13 away from each other. However, the carriers 37 and 37' are held tightly by the frangible bolt 81 as shown in FIG. 2A.

The axial movement of the sections 36 and 36' away from each other with the carriers being held against relative axial movement by the frangible bolt 81 results in release of the retaining means in that the carriers 37 and 37' pivot as a unit in the clockwise direction relative to the sections 36 and 36'. This pivotal movement of the carriers 37 and 37' relative to the sections 36 and 36' moves the valve elements 39 and 39' out of the grooves 75 and 83, respectively, to a releasing position shown in FIG. 2A. In the releasing position, the valve elements 39 and 39' are freed for movement toward their respective valve seats 51 and 51'. The valve elements are then moved to their closed positions as shown in FIG. 2B under the influence of the springs 65 and 65'. The seal 20 prevents leakage of fluid through the frangible region 31 upon initial rupture (FIG. 2A).

As the separation of the sections 36 and 36' increases, the frangible bolt 81 breaks to allow complete separation of the sections 36 and 36' of the valve body 13. In the closed position, the fluid within the passage 29 and the springs 77 and 77' hold the carriers 37 and 37' against the carrier seats 38 and 38', respectively, and coaxial with the axis 33.

It should be noted that the springs 77 could be removed and the operation of the crashworthy valve 11 would be substantially as described above. Similarly, if the springs 77 were retained and the frangible bolt 81 not used, then the springs 77 and 77' would urge the valve elements 39 and 39' to the releasing position. In this event, operation of the crashworthy valve 11 would be the same as that described above except that, of course, there would be no frangible bolt 81 to break.

The operation of the crashworthy valve 11 when it fails under a bending load is quite similar to the operation of the crashworthy valve when it fails in tension. For example, if a bending load is applied to the crashworthy valve 11 about a transversely extending axis extending through the upper periphery of the valve as viewed in FIG. 2, the lower portion of the frangible region 31 is placed in tension. Accordingly, the lower regions of the sections 36 and 36' tend to axially separate thereby increasing the axial spacing between the pins 46 and 46'. However, the frangible bolt 81 and the springs 77 and 77' tend to maintain the carriers 37 and 37' in engagement. As a consequence, the carriers 37 and 37' pivot as described above to free the valve elements 39 and 39'.

As a practical matter, there is virtually no chance that a pure shear load would be applied to the crashworthy valve 11. Although shear loads may be encountered, they are usually accompanied by bending and/or tension. However, the body portions 15 and 17 have cooperating sloped, conical surfaces 95 which would tend to convert a shear load into a tensile load. Accordingly, the crashworthy valve 11 would fail in the manner described above for tension or bending loads.

FIG. 4 shows a crashworthy valve 11a which is similar to the crashworthy valve 11 (FIGS. 1–3). Portions of the crashworthy valve 11a corresponding to portions of the crashworthy valve 11 are designated by corresponding reference numerals followed by the letter a. Except to the extent specifically shown or described herein, the crashworthy valve 11a may be identical to the crashworthy valve 11.

A primary difference between the crashworthy valves 11 and 11a is that in the latter the carriers are in the form of linearly movable pistons. In addition, the carriers are not tied together by a frangible bolt and the pivot axis of the valve elements are on the same side of the passage 29a. The embodiment of FIG. 4 further illustrates how the concepts of this invention can be embodied in a different structural form.

The valve body 13a is of a somewhat different configuration than the valve body 13, but does include an annular V-shaped frangible region 31a which divides the valve body into two sections 36a and 36'a. The valve body 13a has a cylindrical bore 85 and an annular shoulder 86.

The crashworthy valve 11 includes carriers 37a and 37'a of identical construction and mounted for movement along a path coaxial with the central axis 33a by the bores 85 and 85', respectively. The carrier 37a includes a web or spider 43a, a tubular section 41a, and a boss 82a.

In the embodiment of FIG. 4, the spring 65a is a coil compression spring rather than a torsion spring and bears at one end against a spring retainer 87 and at the other end against the carrier 37a. The spring retainer 87 is retained within the passage 29a of the valve body 13a by a retaining ring 89. Thus, the spring 65a urges the carrier 37a to the right and into engagement with the carrier 37a. The carrier 37a is axially spaced from the shoulder 86 in the position shown in FIG. 4.

The valve element 39a is mounted by a pin 53a for movement between the open position shown in FIG. 4 and a closed position in which it engages the valve seat 51a to close the passage 29a. The pin 53a extends through two tabs 90 (only one being shown in FIG. 4) on the carrier 37a. A torsion spring 65a on the pin 53a urges the valve element 39a toward the closed position.

The valve element 39a is normally held in the open position by holding means 69a in the form of a radially extending pin mounted on a projection 91 which form a portion of the section 36a. The end of the valve element 39a engages the pin 69a to retain the valve element 39 in the open position. Thus, the pin 69a defines a ledge for holding the valve element 39a in the open position. The valve element 39a is not opened to the same degree as the valve element 39; however, the valve element 39a could be opened as fully as the valve 39 if desired.

The valve element 39a is identical to the valve element 39'a. The valve element 39'a is held in the open position by a pin 93 on a projection 91' in the same manner that the pin 69a holds the valve element 39a open. The projection 91' is received in an indexing slot 94 formed in the body portion 17.

Under normal operating conditions, the crashworthy valve 11a is open as shown in FIG. 4. The carrier 37a and the valve element 39a are retained against movement relative to the section 36a toward the section 36'a by the engagement of the bosses 82a and 82'a. However, if the frangible region 31a is ruptured in tension, the sections 36a and 36'a move relatively away from each other and in an axial direction. The springs 65a and 65'a resiliently hold the bosses 82a and 82'a of the carriers 37a and 37'a in engagement as the sections 36a and 36'a tend to axially separate. Accordingly, the carriers 37a and 37'a move axially relative to the sections 36a and 36'a as the frangible region 31a distorts under the tensile load. The valve elements 39a and 39'a move with their respective carriers to a releasing position in which they are freed from the pins 69a and 93, respectively. Thereafter, the valve elements 39a and 39'a are pivoted about their respective pivot axes to the closed position by the springs 65a and 65'a.

If failure of the frangible region 31' is brought about by bending or shear, the crashworthy valve 11' functions in the same manner described above with reference to the crashworthy valve 11 except that there is no frangible bolt to rupture subsequent to the rupture of the frangible region 31.

Figure 6:
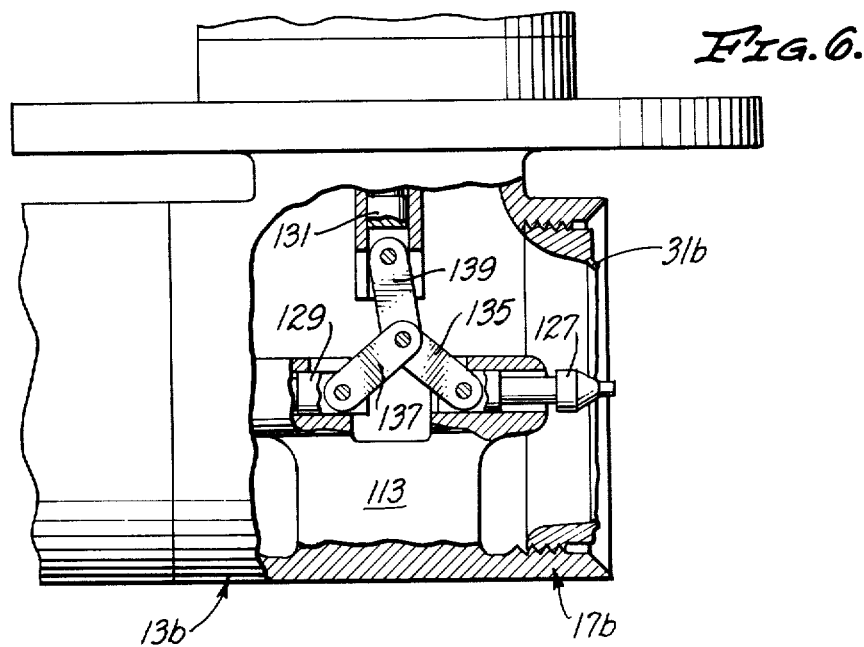
FIG. 6 is a fragmentary, sectional view showing the crashworthy valve of FIG. 5 after the righthand section of the valve body has been broken off.

FIGS. 5 and 6 show a crashworthy valve 11b which includes more than two body sections and more than two valve elements. If any one of the body sections crashes, a linkage 101 operates the other two valve elements so that the passages in all three of the sections are closed off. Portions of the crashworthy valve 11b corresponding to portions of the crashworthy valve 11 are designated by corresponding reference numerals followed by the letter b.

The crashworthy valve 11b includes a valve body 13b which includes a body portion 15b and a body portion 17b. A passage 29b having a central axis 33b extends through the body portions 15b and 17b. The body portion 15b includes an outer tubular member 103, an intermediate threaded sleeve 105 coupled to the tubular member 103 by a retaining ring 107 and an inner retaining sleeve 109. The inner end of the sleeve 105 is threaded into the body portion 17b. The sleeve 105 defines the frangible region 31b and a seal 20b is interposed between the body portions 15b and 17b. The frangible region 31b divides the valve body 13b into an outer section 36b and an inner section 110.

A carrier 37b is mounted in the passage 29b and held against axial outward movement by the retaining sleeve 109. Seals 49b and 50b seal the carrier 37b to the body portion 15b. The carrier 37b includes a tubular section 41b, a web 43b, and a boss 82b. The carrier 37b defines a valve seat 51b.

A valve element 39b which may be substantially identical to the valve element 39 is pivotally mounted on the carrier 37b by a pin 53b. A spring 65b urges the valve element 39b toward a closed position in which it engages the valve seat 51b. The end of the finger 63b of the valve element 39b rests on a flange or ledge 111 formed integrally with the body portion 15b. This normally holds the valve element 39b in the open position. A torsion spring 77b urges the upper end of the valve element and the carrier axially inwardly toward the body portion 17b.

The valve body 13b also includes sections 112 and 114, each of which is identical to the section 36b. Each of the sections 112 and 114 houses a carrier 37b, valve element 39b and associated members all of which may be identical to corresponding members which are housed within the section 36b. The carriers of each of these sections are interconnected by the linkage 101. Specifically, the body portion 17b includes a block 113 defining bores 115 and 117. The body portion 17b also includes a block 119 which defines a bore 121. The block 113 has slots 123 and 125 communicating with the bores 115 and 117, respectively, and the block 119 has two slots 126 communicating with the bore 121.

Three pistons 127, 129 and 131 are slidably mounted in the bores 115, 117 and 121, respectively, and are rigidly affixed to the associated carrier. The piston 127 is rigidly affixed to the boss 82b of the carrier 37b by a frangible bolt 133 which fits loosely in the boss 82b. If desired, the frangible bolt 133 may be eliminated in which event the piston 127 would simply abut the carrier 37b. The end of the boss 82b is firmly seated on a shoulder 134 of the piston 127. The pistons 129 and 131 may be affixed to their associated carriers by idential frangible bolts 133.

The linkage 101 includes links 135, 137 and 139 pivotally connected at their outer ends to the pistons 127, 129 and 131. The links 135, 137 and 139 are pivotally connected adjacent their inner ends to form an inverted Y as viewed in FIG. 5.

When interconnected in this manner, the carrier 37b of the section 36b is tilted out of a position coaxial with the central axis 33b. Specifically, the axis of the carrier 37b is tilted slightly counterclockwise from the central axis 33b. The carriers 37b of the other sections 112 and 114 are similarly tilted, either clockwise or counterclockwise, as may be desired.

Assuming that the frangible region 31b is ruptured by an axially directed tensile load, then the section 36b tends to move axially relative to the associated carrier 37b. This results in removal of the ledge 111 from the finger 63b and consequent freeing of the valve member 39b for pivotal movement by the spring 65b to the closed position. The carrier 37b may pivot or tilt relative to the section 36b to the extent permitted by the loose fit between the boss 82b and the frangible bolt 133.

Prior to rupture of the frangible region 31b the piston 127 is retained against axial movement to the right as viewed in FIG. 5 by retaining means which includes the carrier 37b, the retaining sleeve 109 of the section 36b, the valve element 39b, and the surface defining the groove 63b. Rupture of the frangible region 31b results in releasing the piston 127 from this restraint. Consequently, the piston 127 is moved to the right by the pulling action of the section 36b via the frangible bolt 133 and/or the springs 77b of the sections 112 and 114. In other words, the carriers 37b of the sections 112 and 114 are moved axially toward the central section 110 to thereby release the associated valve elements 39b for movement to the closed position. Thus, the linkage 101 interconnects the carriers 37b of all of the sections in such a way that rupture of any of the frangible regions results in closure of all of the valve elements 39b.

Figure 8:
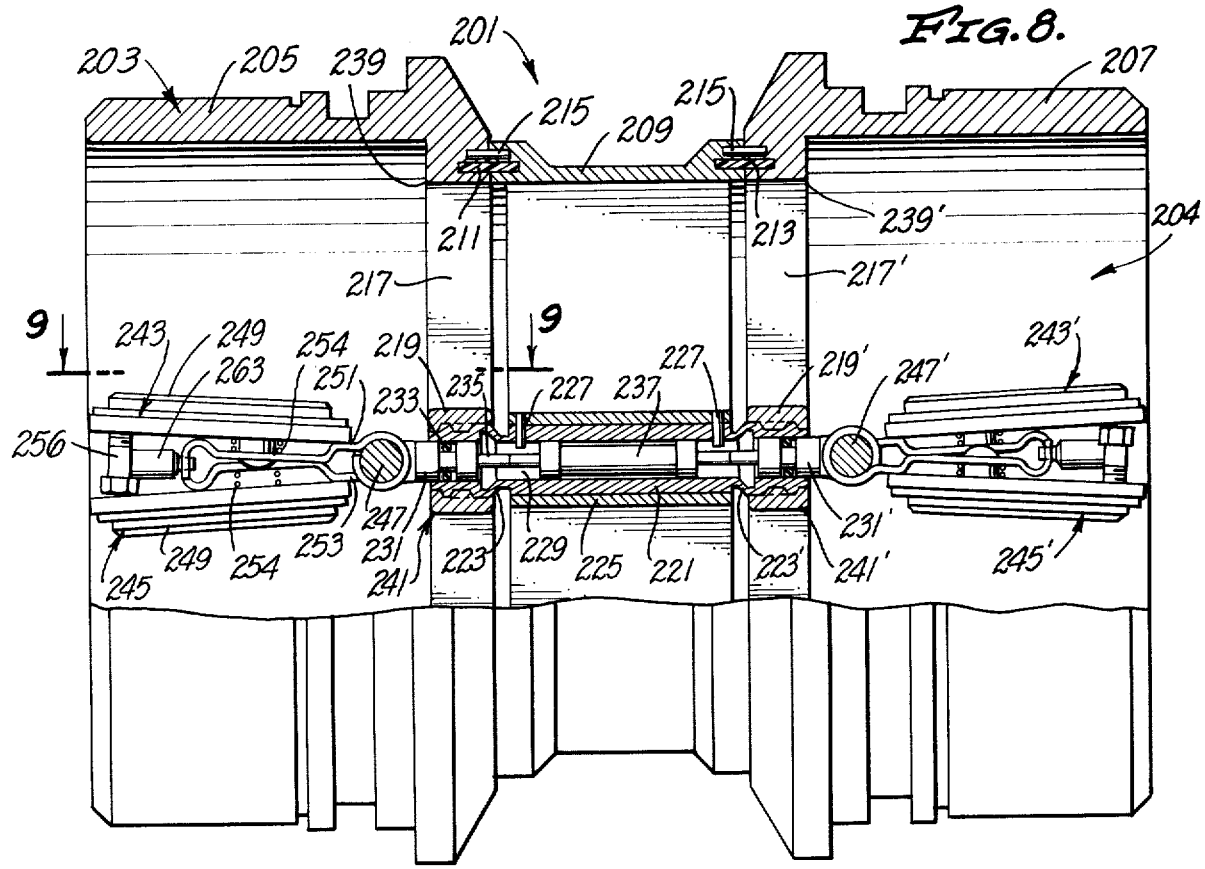
FIG. 8 is a fragmentary view partially in section taken generally along line 8—8 of FIG. 7.
Figure 9:
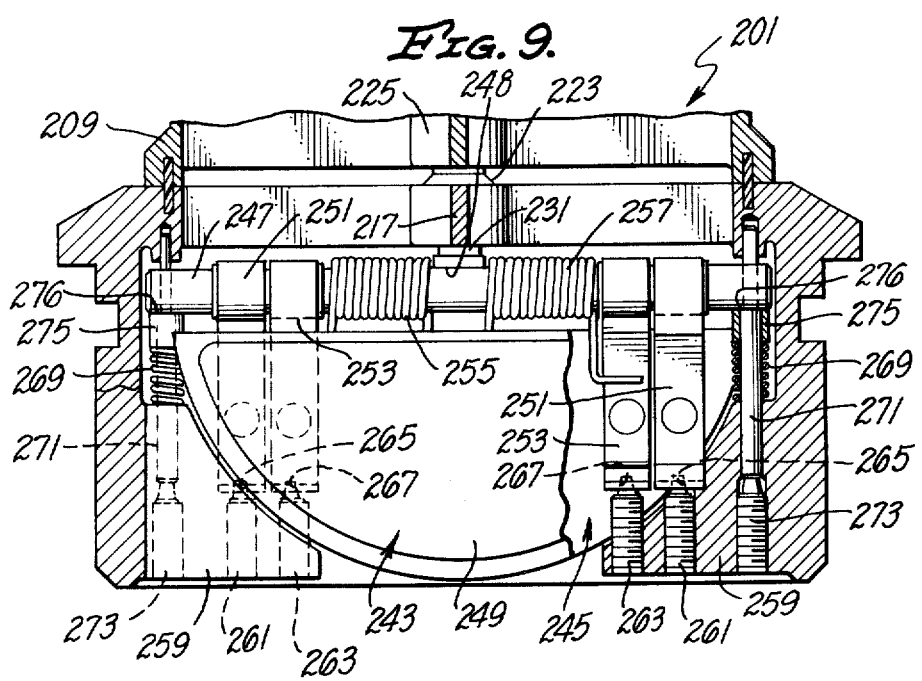
FIG. 9 is a fragmentary view, partially in section, taken generally along line 9—9 of FIG. 8.

FIGS. 7–9 show a crashworthy valve 201, the principle advantage of which is that it is usable with large diameter conduits. The crashworthy valve 201 embodies the movable carrier and pivotable valve element concepts discussed hereinabove. However, to adapt the crashworthy valve 201 to large diameters, two valve elements pivotable about the same axis are employed for each section of the valve body.

The crashworthy valve 201 includes a valve body 203 which has an axial passage 204 extending through it. The valve body 201 includes a body section 205 and a body section 207. The body sections 205 and 207 are axially spaced apart by a tubular spacer 209 which is sealed to the body sections 205 and 207 by seals 211 and 213, respectively. The spacer 209 is coupled to the body sections 205 and 207 by structurally weak indexing pins 215. Although the indexing pins 215 may form a portion of the frangible means for holding the body sections 205 and 207 together, in the embodiment illustrated, they do not resist axial separation of the body sections from the spacer 209.

The body section 207 is identical to the body section 205 and portions of the body section 207 corresponding to portions of the body section 205 are designated by corresponding primed reference numerals. The body section 205 has a radially extending web and a boss 219 located at the center of the web 217 and coaxial with the passage 204.

A tubular frangible connector 221 is suitably connected to the bosses 219 and 219'. The frangible connector 221 has annular frangible regions 223 and 223' located slightly axially inwardly of the bosses 219 and 219', respectively. The central region of the frangible connector 221 is housed in a sleeve 225 which extends between the webs 217 and 217'. Radial pins 227 interconnect the frangible connector 221 and the sleeve 225 and project radially into a bore 229 which extends through the frangible connector.

Identical carriers 231 and 231' in the form of pistons are mounted for axial sliding movement in the bore 229. The carrier 231 has an O-ring seal 233 installed thereon an an axially extending stem 235 of reduced diameter. A spacer 237 in the form of a piston is slidably mounted in the bore 229 intermediate the carrier 231 and the carrier 231'.

The body section 205 defines a pair of valve seats 239 and 241, each of which is of generally semicircular configuration. Valve elements 243 and 245 are pivotally mounted on a shaft 247. Although the shaft 247 could be mounted on the carrier 231, in the embodiment illustrated, the shaft is not mounted on the carrier, but rather abuts a surface 248 of the carrier 231 to thereby cause the shaft 247 and the carrier 231 to move together. Valve elements 243' and 245' which are identical to the valve elements 243 and 245, respectively, are mounted on the shaft 247'. The shaft 247 mounts the valve elements 243 and 245 for pivotal movement about a pivot axis which extends transverse to the axis of the passage 204 and through a central region of that passage. The valve elements 243 and 245 are pivotable between an open position shown in FIG. 8 in which they provide a minimal obstruction to the flow of fluid through the passage 204 and a closed position in which they engage the valve seats 239 and 241, respectively, to close the passage 204 at such valve seats.

The valve element 243 includes a plate 249 and a plurality of fingers 251 (two being illustrated in FIG. 9). The valve element 245 is of substantially identical construction except that the fingers thereof are designated by the reference numerals 253 and these fingers are located inboard of the fingers 251 as shown in FIG. 9. The fingers 251 and 253 are relatively loosely attached to the associated plates 249. A coil compression spring 254 acts between the plate 249 and one of the fingers 251 and an identical spring 254 acts between the plate 249 of the valve element 245 and the one of the fingers 253. These springs 254 assure that the valve elements 243 and 245 will be properly seated against their valve seats 239 and 241. A screw 256 is threaded into the valve element 243 and projects toward and into engagement with the valve element 245 for the purpose of reducing vibration of the valve elements.

The valve elements 243 and 245 are resiliently biased toward their closed positions by torsion springs 255 and 257, respectively, which are wound on the shaft 247 on opposite sides of the carrier 231.

Holding means are provided for normally retaining the valve elements 243 and 245 in the open position. Identical holding means is provided for the valve elements 243' and 245'. The holding means include radially extending lugs 259 on the body section 205, a pair of screws 261, a pair of screws 263, apertures 265 formed in tabs at the ends of the fingers 251, and apertures 267 formed in tabs in the fingers 253. The screws 261 and 263 are attached by screw threads to the lugs 259. The ends of the screws 261 and 263 are receivable within the apertures 265 and 267, respectively. Thus, the inner ends of the screws 261 and 263 define ledges which cooperate with the apertures 265 and 267 to hold the valve elements 243 and 245 in the open position. By moving the carrier 231 and the valve elements 243 and 245 to the right as viewed in FIG. 8, the apertures 265 and 267 are pulled off of the screws 261 and 263 to allow closure of the valve elements 243 and 245. The amount of such movement of the carrier 231 which is necessary to free the valve elements 243 and 245 can be adjusted by adjusting the axial positions of the screws 261 and 263 in the lugs 259.

The carrier 231 and the valve elements 243 and 245 are urged in a direction to free the valve elements from the screws 261 and 263 by a pair of coil compression springs 269 (FIG. 9) which are mounted on stepped guide rods 271. The guide rods 271 are mounted at their opposite ends by the body section 205 and the guide rods project through the shaft 247 to thereby mount the shaft. Screws 273 are threaded into the lugs 259 and engage the guide rods 271, respectively. Each of the springs 269 bears at one end on the lug 259 and at the other end on a collar 275 which in turn abuts the shaft 247. The position of the shaft 247, the carrier 231, and the valve elements 243 and 245 can be adjusted by turning of the screws 273.

The crashworthy valve 201 has tensile, bending, and shear failure modes, each of which will result in closure of all four of the valve elements. Under normal operating conditions, the spacer 237 holds the carriers 231 and 231' in axially spaced relationship as shown in FIG. 8. The spacer 237 is, in turn, axially compressively loaded by the springs 269 and the corresponding springs (not shown) for the valve elements 243' and 245'. Thus, each of the carriers 231 and 231' is normally retained against movement toward each other by the shoulders 276 and screws 273.

When the crashworthy valve 201 is subjected to a predetermined tensile load, one or both of the frangible regions 223 and 223' rupture, and the body sections 205 and 207 separate axially from each other. To the extent that this separation occurs, the springs 269 urge the carrier 231 and the valve elements 243 and 245 to the right as viewed in FIG. 8 relative to the section 205. Ultimately the apertures 265 and 267 become disengaged from the screws 261 and 263. This allows the springs 255 and 257 to pivot the valve elements 243 and 245 about a common pivot axis defined by the shaft 247 to the closed position in which each of these valve elements tightly engages its valve seat 239 and 241, respectively. It is apparent from FIG. 8 that the valve elements 243 and 245 pivot in the opposite directions in moving to their closed positions. The springs 269 also serve to maintain the carrier 231 in an extreme forward position subsequent to rupture of the frangible regions 223 and 223'. The pins 227 serve to hold the piston 237 within the frangible connector 221 after rupture of the frangible regions 223 and 223'. The valve elements 243' and 245' are moved to their closed positions in the same manner as the valve elements 243 and 245.

Each of the above-described embodiments of this invention includes a crashworthy valve employing a valve element pivotally mounted on a movable carrier. In each of the embodiments, the valve elements are substantially out of the flow path and provide minimum resistance to flow and minimum pressure drop. The embodiments selected for illustration are merely illustrative of some of the ways in which a pivotable valve elements can be utilized in a crashworthy valve.

Although exemplary embodiments of this invention have been shown and described, many changes, modifications and substitutions may be made by those having ordinary skill in the art without necessarily departing from the spirit and scope of this invention.

I claim:
1. A crashworthy valve comprising:
   body means having a passage therethrough, said body means including first and second sections and a frangible region therebetween which allows relative movement between said sections when said sections are subjected to a predetermined load;
   means defining a valve seat in each said section;
   at least one valve element cooperating with the associated valve seat in each said section;
   means for mounting each said valve element for pivotable movement about a pivot axis between an open position in which the valve element is spaced from the associated valve seat and a closed position in which the valve element is in engagement with the associated valve seat to close said passage at each said valve seat;
   means in the passageway in each section for releasably holding each said valve element in said open position; and
   means responsive to relative movement between said sections for freeing each said valve element from the holding action of each said holding means whereby each said valve element is freed for movement to said closed position.

2. A crashworthy valve as defined in claim 1 wherein each said pivot axis extends generally transverse to the axis of said passage, each said pivot axis being adjacent the periphery of said passage.

3. A crashworthy valve as defined in claim 1 wherein each said holding means includes means carried by said body means for engaging each said valve element to hold each said valve element in said open position, and each said freeing means includes means responsive to the relative movement between said sections for allowing relative movement between each said valve element and each said associated engaging means to disengage each valve element and the associated engaging means.

4. A crashworthy valve as defined in claim 1 wherein said holding means includes a holding member engageable with the valve element to hold the latter in said open position and means for mounting the holding member on said body means for movement radially of the body means whereby the location of said valve element in the open position can be varied.

5. A crashworthy valve comprising:
   body means having a passage therethrough, said body means including first and second sections and a frangible region therebetween which allows relative movement between said sections when said body means is subjected to a predetermined load;
   means defining spaced valve seats in said passage and cooperating with each said section;
   spaced carriers in said passage cooperating with the associated valve seat;
   means for mounting each said carrier for movement along a path in said passage;
   at least one valve element associated with each carrier and valve seat;
   means for mounting each said valve element for pivotal movement relative to said associated carrier between an open position in which the valve element is spaced from the associated valve seat and a closed position in which the valve element is in engagement with said associated valve seat to close said passage at said valve seat, each said valve element being movable with the associated carrier along said path;
   means for releasably holding each said valve element in said open position, said holding means being responsive to movement of each said valve element and the associated carrier along said path to release the associated valve element to allow the said valve element to be moved to the closed position; and
   releasable means for retaining each said carrier against sufficient movement along said path to release the associated valve element, said releasable retaining means being responsive to relative movement between said sections to release the associated carrier for sufficient movement along said path to release the associated valve element from the associated holding means.

6. A crashworthy valve as defined in claim 5 wherein each said carrier includes a piston and said path is substantially linear.

7. A crashworthy valve as defined in claim 5 wherein said carrier is mounted for generally pivotal movement and said path is arcuate.

8. A crashworthy valve as defined in claim 5 wherein each said valve seat is on the associated carrier.

9. A crashworthy valve as defined in claim 5 wherein each said retaining means includes means carried by said body means for defining a ledge, a portion of each said valve element being supported on the associated ledge in said open position, the movement of said valve element with said associated carrier along said path freeing said valve element from the associated ledge.

10. A crashworthy valve as defined in claim 5 including resilient means associated with each valve element for urging the associated valve element to pivot from said open position toward said closed position and resilient means for urging each said carrier along said path in a direction to release the associated valve element.

11. A crashworthy valve as defined in claim 10 wherein each valve element pivots about a pivot axis in moving between said positions thereof, said pivot axis extends generally transverse to the axis of said passage, and each said retaining means including means carried by said body means for defining a ledge associated with each valve element, at least a portion of each said valve element being supported on the associated ledge in said open position, the movement of each said valve element with the associated carrier along said path freeing said valve element from the associated ledge to thereby release said valve element for movement toward the closed position.

12. A crashworthy valve as defined in claim 5 wherein said means for mounting said valve element mounts said valve element on said carrier.

13. A crashworthy valve comprising:
body means having a passage therethrough, said body means including first and second sections and a frangible region therebetween which allows relative movement between said sections when said sections are subjected to a predetermined load;
means in each section defining a valve seat;
means in each section for mounting the valve element for pivotal movement between an open position in which the valve element is spaced from the valve seat and a closed position in which the valve element is in engagement with said valve seat;
resilient means in each section for urging the valve element to said closed position;
holding means in each section for holding the valve element in said open position;
each said valve element being movable in a first direction to a releasing position in response to a predetermined amount of said relative movement between said sections, each said valve element being spaced from said valve seat in said releasing position; and
each said valve element being freed of said holding means in response to said valve element reaching said releasing position whereby the movement of said valve element to said releasing position causes the release of said valve element and allows said resilient means to subsequently move the valve element to the closed position.

14. A crashworthy valve comprising:
body means having a passage therethrough, said body means including first and second sections and a frangible region which allows relative movement between said sections when said sections are subjected to a predetermined load;
a first valve element;
means for mounting said first valve element for movement along a first path;
first mounting means for mounting said first valve element for pivotal movement about a first pivot axis between an open position and a closed position;
first holding means for releasably holding said first valve element in the open position thereof, said first holding means being releasable in response to movement of said first valve element along said first path toward said second section;
a second valve element;
means for mounting said second valve element for movement along a second path;
second mounting means for mounting said second valve element for pivotal movement about a second pivot axis between an open position and a closed position;
second holding means for releasably holding said second valve element in the open position thereof, said second holding means being releasable in response to movement of said second valve element along said second path toward said first section; and
cooperating means for preventing sufficient movement of said first and second valve elements along their respective paths to release said first and second valve elements, said cooperating means being responsive to said relative movement between said sections for allowing said first and second valve elements to move along their respective paths to release said valve element.

15. A crashworthy valve as defined in claim 14 wherein each of said first and second pivot axes extend generally transverse to the axis of said passage, said pivot axes being on opposite sides of said passage.

16. A crashworthy valve as defined in claim 14 wherein said cooperating means includes frangible means for interconnecting the means for mounting the first valve element for movement along the first path with the means for mounting the second valve element for movement along the second path.

17. A crashworthy valve as defined in claim 14 wherein said means for mounting the first valve element for movement along a first path includes first carrier means and said means for mounting the second valve element for movement along a second path includes second carrier means, said first carrier means is mounted for pivotal movement about a third pivot axis, said second carrier means is mounted for pivotal movement about a fourth pivot axis, said third and fourth pivot axes extending generally transverse to the axis of said passage and being on opposite sides of said passage.

18. A crashworthy valve as defined in claim 14 wherein said means for mounting the first valve element for movement along a first path includes first carrier means and said means for mounting the second valve element for movement along a second path includes second carrier means, said crashworthy valve including means for urging said first and second carrier means toward each other, said first carrier means and said second carrier means being drivingly interrelated whereby movement of said first and second carrier means toward each other is substantially prevented.

19. A crashworthy valve as defined in claim 14 wherein said means for mounting the first valve element for movement along a first path includes first carrier means and said means for mounting the second valve element for movement along a second path includes second carrier means, said cooperating means includes a linkage for interconnecting said first and second carrier means.

20. A crashworthy valve as defined in claim 1 wherein said holding means includes a rotatable member rotatably mounted on said body means and means including an eccentric surface for defining a groove on said rotatable member for receiving a portion of said valve element in said open position, said eccentric surface being eccentric relative to the axis of rotation of said rotatable member.

21. A crashworthy valve comprising:
  body means having a passage therethrough, said body means including first and second sections and a frangible region which is breakable to allow separation of said sections when said sections are subjected to a predetermined load;
  means defining a valve seat in said passage on each side of said frangible region;
  a movable member cooperating with each said valve seat;
  first means for mounting each said movable member on said body means for movement along a path relative to said body means between the first and second positions;
  at least one valve element cooperating with each valve seat;
  means for mounting each said valve element on the associated movable member for pivotal movement about a pivot axis;
  each said valve element having an open position in which the valve element is spaced from the associated valve seat and a closed position in which the valve element is in engagement with the associated valve seat;
  means for releasably retaining each said valve element in said open position and each said movable member in said first position; and
  means responsive to the separation of said sections for freeing each said movable member for movement to said second position and each said valve element for movement to the closed position.

22. A crashworthy valve as defined in claim 21 wherein said first means mounts the movable member for pivotal movement.

23. A crashworthy valve as defined in claim 22 wherein said valve seat is provided on said body means, said crashworthy valve including resilient means for urging said valve element toward said open position and said movable member toward said second position.

24. A crashworthy valve comprising:
  body means having a passage therethrough, said body means including first and second sections and a frangible region which is breakable to allow separation of said sections when said sections are subjected to a predetermined load;
  a first valve unit including a first valve element, a first movable member, means for mounting said first movable member within said body means for movement from a first position to a second position, and first mounting means for mounting said first valve element on said first movable member for pivotal movement about a first pivot axis, said first valve element having an open position and a closed position;
  a second valve unit including a second valve element, a second movable member, means for mounting said second movable member within said body means for movement from a first position to a second position, and second mounting means for mounting said second valve element on said second movable member for pivotal movement about a second pivot axis, said second valve element having an open position and a closed position; and
  resilient means for urging said first and second valve units into engagement with each other with the engagement of said first and second valve units retaining said movable members in said first positions thereof and said valve elements in said open positions thereof whereby upon separation of said sections the first and second valve units lose their mutual support so that said movable members are freed to move to said second positions thereof and said valve elements are freed to move to said closed positions thereof.

25. A crashworthy valve as set forth in claim 1 further including carrier means cooperating with each said valve element and valve seat and operative in response to relative movement between said sections to move toward said frangible region for effecting freeing of the associated valve element for movement thereof to the closed position.

* * * * *

Notice of Adverse Decision in Interference

In Interference No. 99,401, involving Patent No. 3,913,603, J. Torres, CRASHWORTHY FLAPPER VALVE, final judgment adverse to the patentee was rendered Aug. 19, 1977, as to claims 1–3, 5, 6, 8–14, 18 and 21.

[*Official Gazette December 20, 1977.*]

Disclaimer 3,913,603.—*Jorge Torres*, Newbury Park, Calif. CRASHWORTHY FLAPPER VALVE. Patent dated Oct. 21, 1975. Disclaimer filed Mar. 6, 1978, by the assignee, *Aeroquip Corporation*.

Hereby enters this disclaimer to claims 1, 2, 3, 5, 6, 8, 9, 10, 11, 12, 13, 14, 18 and 21 of said patent.

[*Official Gazette April 11, 1978.*]